US008162282B2

(12) United States Patent
Hu et al.

(10) Patent No.: US 8,162,282 B2
(45) Date of Patent: Apr. 24, 2012

(54) ELECTRONIC DEVICE WITH SUPPORT

(75) Inventors: Biao Hu, Shenzhen (CN); Chia-Te Yu, Taipei Hsien (TW); Liang-Yi Lu, Taipei Hsien (TW); Chung-Yuan Chen, Taipei Hsien (TW); Lin-Lin Pan, Shenzhen (CN); Che-Yu Chou, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 349 days.

(21) Appl. No.: 12/507,093

(22) Filed: Jul. 22, 2009

(65) Prior Publication Data
US 2010/0308202 A1 Dec. 9, 2010

(30) Foreign Application Priority Data
Jun. 5, 2009 (CN) .......................... 2009 1 0302988

(51) Int. Cl.
*A47B 97/04* (2006.01)
(52) U.S. Cl. ........................................ 248/447; 248/460

(58) Field of Classification Search .................. 248/447, 248/454, 455, 456, 457, 460; 40/120, 780, 40/749, 750, 754, 748, 755, 756; 206/305, 206/320
See application file for complete search history.

(56) References Cited

U.S. PATENT DOCUMENTS

| 4,509,712 | A | * | 4/1985 | Moller | 248/464 |
| 4,622,767 | A | * | 11/1986 | Sullivan | 40/120 |
| 6,082,033 | A | * | 7/2000 | Skinner | 40/750 |
| 7,490,427 | B2 | * | 2/2009 | Dahlquist | 40/755 |
| 2003/0213886 | A1 | * | 11/2003 | Gilbert | 248/454 |
| 2009/0152428 | A1 | * | 6/2009 | Cilia | 248/346.03 |

* cited by examiner

*Primary Examiner* — A. Joseph Wujciak, III
(74) *Attorney, Agent, or Firm* — Altis Law Group, Inc.

(57) ABSTRACT

An electronic device, comprising: a back cover, a first support, and a second support; wherein, the back cover forms a receiving groove; the first support comprises a support portion and a connection portion rotationally connected to the back cover; the second support comprises a support portion, at least one hook portion, and a connection portion rotationally connected to the back cover; when in a folded position, the first support and the second support are received in the receiving groove of the back cover; and when in an unfolded position, the support portion of the first support is engaged with the at least one hook portion of the second support; the second support cooperates with an edge of the electronic device to form a stable structure to support the electronic device.

6 Claims, 4 Drawing Sheets

ELECTRONIC DEVICE WITH SUPPORT

BACKGROUND

1. Technical Field

The present disclosure relates to an electronic device with a support.

2. Description of Related Art

Many electronic devices, such as, a DPF (digital photo frame), includes a support member for supporting the DPF.

Generally, the support includes two types: a rotatable support and a detectable support. The rotatable support can be rotated by an angle to support the electronic device according a user needs. However, the rotatable support is a single support, in order to support the whole weight of the electronic device, material of the rotatable support must be very firm. So, it is difficult for user to choose the firm material for making of the support. A detectable support can be installed in a different angle to support the electronic device. However, over the tine, the user might have to repeat attaching and detaching the support, which may results in damages to the electronic device, and is time-consuming.

Therefore, what is need is an electronic device including a different kind of support to support the electronic device.

DETAILED DESCRIPTION

Figure 1:
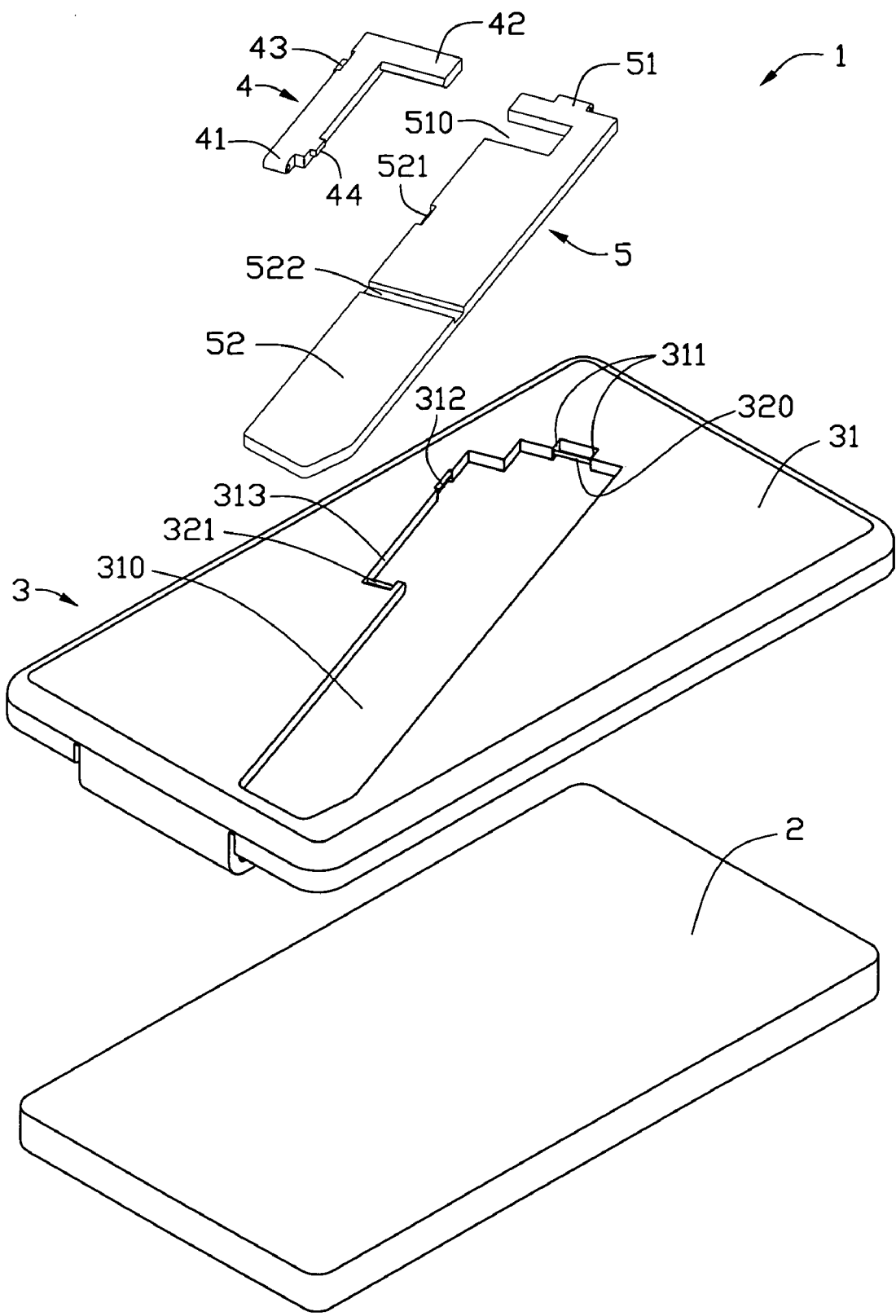
FIG. 1 is an exploded, isometric view of an electronic device, including a first support and a second support, in accordance with an exemplary embodiment.

FIG. 1 is an exploded, isometric view of an electronic device, including a first support 4 and a second support 5, in accordance with an exemplary embodiment. The electronic device 1 includes a main body 2, a back cover 3 assembled to the main body 2, the first support 4 is mounted to the back cover 3, and the second support 5 is also mounted to the back cover 3. In the exemplary embodiment, the electronic device 1 is a mobile phone.

Figure 2:
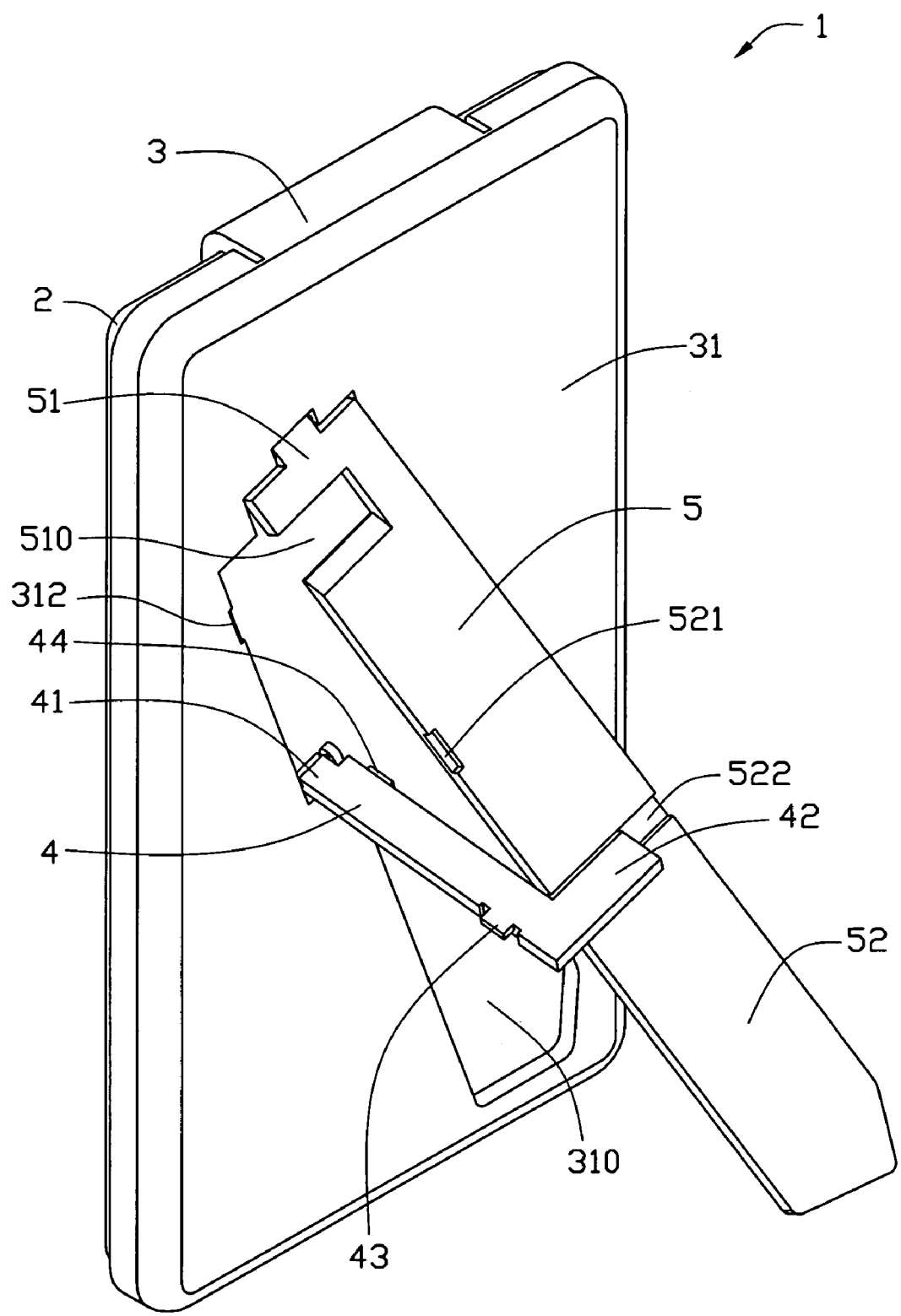
FIG. 2 is an isometric view of the electronic device of FIG. 1 which is vertically supported.

Referring to FIG. 2, the back cover 3, which includes an exterior surface 31, is generally rectangular in shape. A receiving groove 310 is formed in the exterior surface 31. A hook groove 312 is formed in a side surface (not labeled) of the receiving groove 310. A first rotation axel 320 is formed between two side surfaces 311 of a top portion (not labeled) of the receiving groove 310. A second rotation axel 321 is protruded from a side surface 313 of a middle portion of the receiving groove 310.

The first support 4, which includes a connection portion 41 and a support portion 42, is substantially L shaped. A hook 43 and a protruding portion 44 are formed on two opposite sides of the support portion 42, respectively.

The second support 5, which includes a connection portion 51, a support portion 52, a hook groove 521, and a hook portion 522, is generally rectangular in shape. The hook groove 521 is formed in a side edge (not labeled) of the second support 5. A rectangular cutout 510 nearing the connection portion 51 is formed. In the exemplary embodiment, the hook portion 522 is a groove extending along a width direction of the second support 5.

Figure 3:
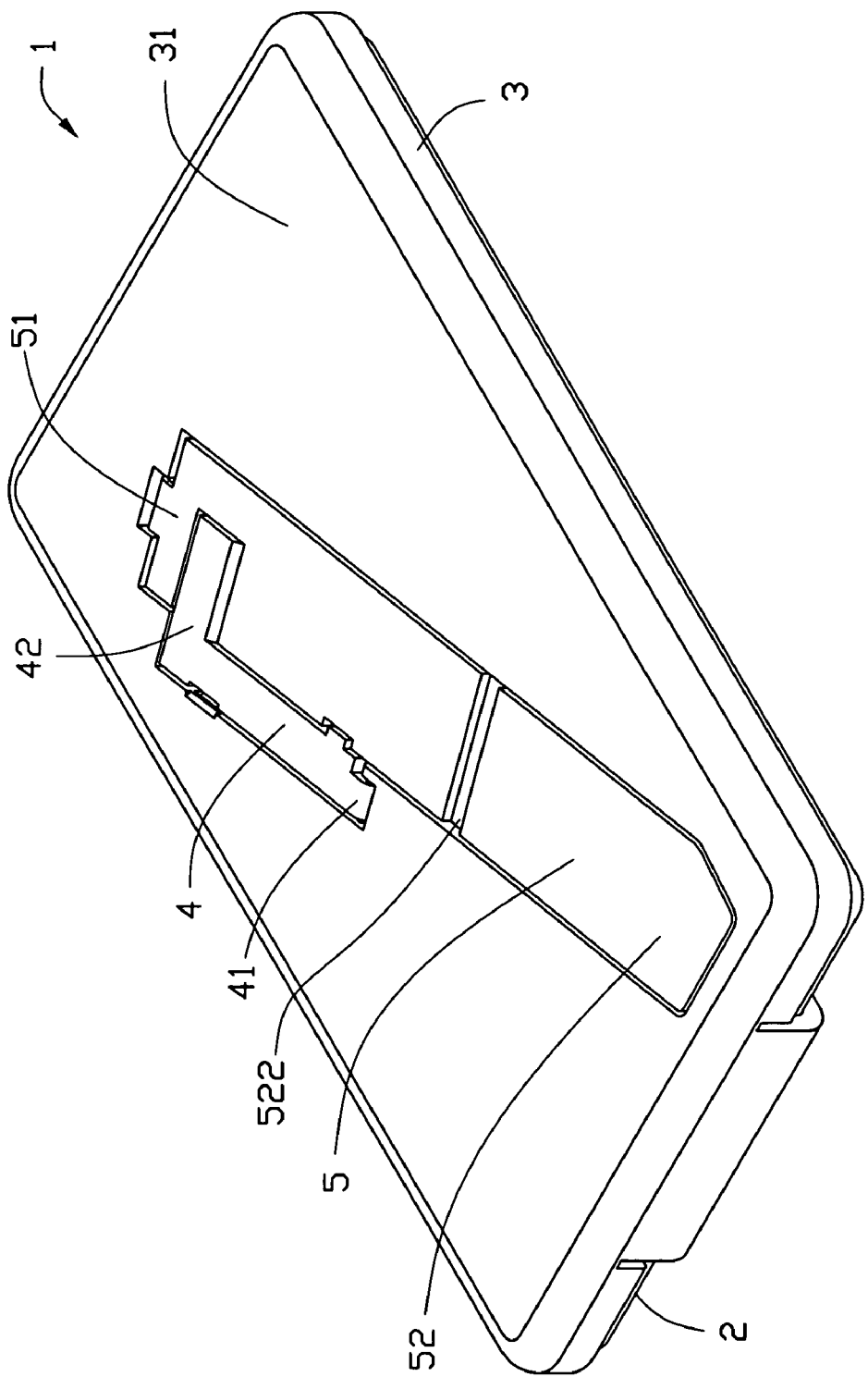
FIG. 3 is an isometric view of the electronic device of FIG. 1, showing that the two supports are folded in the electronic device.

Referring to FIG. 3, the connection portion 41 of the first support 4 is rotationally connected to the second rotation axel 321 of the back cover 3. The connection portion 51 of the second support 5 is rotationally connected to the first rotation axel 320 of the back cover 3. The first support 4 and the second support 5 can be kept in a folded position and in an unfolded position. In the folded position, the first support 4 and the second support 5 are received in the receiving groove 310, and one end (not labeled) of the first support 4 away from the connection portion 41 is received in the cutout 510. The hook 43 of the first support 4 is engaged with the hook groove 312 of the receiving groove 310, thereby limiting the movement of the first support 4. The protruding portion 44 of the first support 4 is received in the hook groove 521 of the second support 5, thereby limiting the movement of the second support 5.

Figure 4:
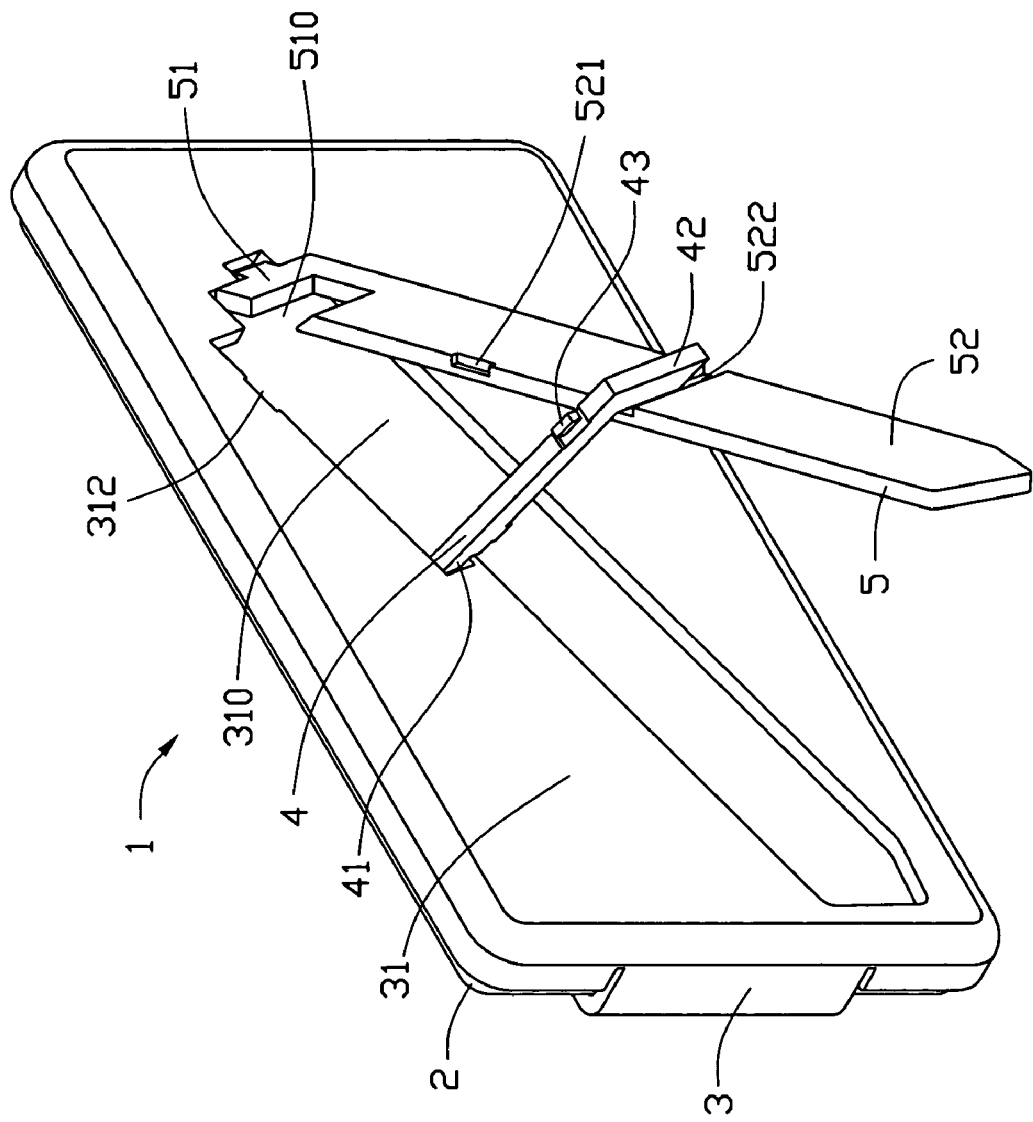
FIG. 4 is an isometric view of the electronic device of FIG. 1 which is horizontally supported.

Referring to FIG. 4, when in the unfolded position, the first support 4 and the second support 5 are rotated by a predetermined angle, respectively. The support portion 42 of the first support 4 is engaged with the hook portion 522 of the second support 5. The second support 5 cooperates with an edge of the electronic device 1 to form a stable structure to support the electronic device 1.

Herein, the number of the hook portion 522 of the second support 5 are not limited. There may be a plurality of hook portions 522, which are formed in the second support 5. The support portion 42 of the first support 4 is selectively engaged with one of a number of hook portions 522 of the second support 5, thereby making the second support 5 to support the electronic device 1 at a different angle.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device, comprising: a back cover, a first support, and a second support; wherein, the back cover forms a receiving groove, wherein a hook groove is formed in a side surface of the receiving groove;

the first support comprises a first support portion and a first connection portion rotationally connected to the back cover, the first support portion extending outwardly from the first connection portion, wherein a hook and a protruding portion are formed on two opposite sides of the first support portion;

the second support comprises, a second support portion, at least one hook for engaging with the first support portion, and a second connection portion rotationally connected to the back cover, the second support portion extending from the second connection portion, wherein a hook groove is formed in a side edge of the second support portion;

when in a folded position, the first support and the second support are received in the receiving groove of the back cover, the hook of the first support is engaged with the hook groove of the receiving groove, and the protruding portion is received in the hook groove of the second support; and when in an unfolded position, the first support portion is engaged with the at least one hook portion of the second support; the second support cooperates with an edge of the electronic device to form a stable structure to support the electronic device.

2. The electronic device as described in claim 1, wherein each of the at least one hook portion is a groove extending along a width direction of the second support.

3. The electronic device as described in claim 1, wherein a first rotation axel is formed between two side surfaces of a top portion of the receiving groove; a second rotation axel is protruded from a side surface of a middle portion of the receiving groove; the connection portion of the first support is rotationally connected to the back cover, thereby making the connection portion rotationally connected to the second rotation axel; the connection portion of the second support is rotationally connected to the back cover, thereby making the connection portion rotationally connected to the first rotation axel.

4. The electronic device as described in claim 1, wherein a cutout nearing the connection portion of the second support is formed; when the first support and the second support are in the folded state, one end of the first support away from the connection portion is received in the cutout.

5. The electronic device as described in claim 1, wherein the electronic device is a mobile phone.

6. The electronic device as described in claim 1, wherein the first support is substantially L shaped.

* * * * *